(12) United States Patent
Plaza et al.

(10) Patent No.: US 8,313,675 B2
(45) Date of Patent: Nov. 20, 2012

(54) DEMOLDING OF OPHTHALMIC LENSES DURING THE MANUFACTURE THEREOF

(75) Inventors: Gerardo Plaza, Ponce, PR (US); Ricardo J. Aponte, Coamo, PR (US); Eli Sanchez, Camuy, PR (US); Ruben Joel Colon, Santa Isabel, PR (US); David Chiang, Pleasanton, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 6 days.

(21) Appl. No.: 12/849,645

(22) Filed: Aug. 3, 2010

(65) Prior Publication Data
US 2011/0089584 A1   Apr. 21, 2011

Related U.S. Application Data

(60) Provisional application No. 61/238,565, filed on Aug. 31, 2009.

(51) Int. Cl.
*B29D 11/00*   (2006.01)
(52) U.S. Cl. .................................................. 264/1.32
(58) Field of Classification Search ............... 264/1.32
See application file for complete search history.

(56) References Cited

U.S. PATENT DOCUMENTS

| | | |
|---|---|---|
| 3,882,036 A | 5/1975 | Krezanoski et al. |
| 3,935,291 A | 1/1976 | Jackson |
| 4,121,896 A | 10/1978 | Shepherd |
| 4,495,313 A | 1/1985 | Larsen |
| 4,497,754 A | 2/1985 | Padoan |
| 4,565,348 A | 1/1986 | Larsen |
| 4,640,489 A | 2/1987 | Larsen |
| 4,889,664 A | 12/1989 | Kindt-Larsen et al. |
| 4,955,580 A | 9/1990 | Seden et al. |
| 4,983,332 A | 1/1991 | Hahn et al. |
| 4,985,186 A | 1/1991 | Nose et al. |
| 5,039,459 A | 8/1991 | Kindt-Larsen et al. |
| 5,080,839 A | 1/1992 | Kindt-Larsen |
| 5,094,609 A | 3/1992 | Kindt-Larsen |
| 5,114,455 A | 5/1992 | Hirota et al. |
| 5,158,718 A | 10/1992 | Thakrar et al. |

(Continued)

FOREIGN PATENT DOCUMENTS
EP   0 750 981 A1   1/1997
(Continued)

OTHER PUBLICATIONS

PCT International Search Report completed Sep. 14, 2007 and mailed Jan. 23, 2008 from related PCT Application No. PCT/US2007/069679, filed May 24, 2007 (2 pages).

(Continued)

*Primary Examiner* — Larry Thrower
(74) *Attorney, Agent, or Firm* — Klein, O'Neill & Singh, LLP (57) ABSTRACT

Methods, devices, and systems for demolding lens mold assemblies are described in which the lens mold assemblies are positioned below a puncher header each with at least one punch pin. The puncher header is then moved against the lens mold assemblies so that the at least one punch pin of each puncher punches through a lens mold layer of a first mold part to then push against a second lens mold layer of a second mold part to separate the two parts in a demolding process.

10 Claims, 7 Drawing Sheets

U.S. PATENT DOCUMENTS

| | | | |
|---|---|---|---|
| 5,204,126 A | 4/1993 | Singh et al. | |
| 5,264,161 A | 11/1993 | Druskis et al. | |
| 5,316,700 A | 5/1994 | Soye et al. | |
| 5,407,627 A | 4/1995 | Schiller et al. | |
| 5,540,410 A | 7/1996 | Lust et al. | |
| 5,561,970 A | 10/1996 | Edie et al. | |
| 5,607,518 A | 3/1997 | Hoffman et al. | |
| 5,620,635 A | 4/1997 | DeRozier et al. | |
| 5,639,510 A | 6/1997 | Kindt-Larsen et al. | |
| 5,690,866 A | 11/1997 | Andersen et al. | |
| 5,693,268 A | 12/1997 | Widman et al. | |
| 5,804,107 A | 9/1998 | Martin et al. | |
| 5,849,222 A | 12/1998 | Jen et al. | |
| 5,850,107 A | 12/1998 | Kindt-Larsen et al. | |
| 5,895,192 A | 4/1999 | Parnell, Sr. et al. | |
| 5,935,492 A | 8/1999 | Martin et al. | |
| 6,033,603 A | 3/2000 | Lesczynski et al. | |
| 6,039,899 A | 3/2000 | Martin et al. | |
| 6,071,439 A | 6/2000 | Bawa et al. | |
| 6,143,210 A | 11/2000 | Wrue et al. | |
| 6,180,032 B1 | 1/2001 | Parnell, Sr. et al. | |
| 6,183,705 B1 | 2/2001 | Chang | |
| 6,193,369 B1 | 2/2001 | Valint, Jr. et al. | |
| 6,288,852 B1 | 9/2001 | Cameron | |
| 6,310,116 B1 | 10/2001 | Yasuda et al. | |
| 6,315,929 B1 | 11/2001 | Ishihara et al. | |
| 6,405,993 B1 | 6/2002 | Morris | |
| 6,419,859 B2 | 7/2002 | Tanaka et al. | |
| 6,428,723 B1 | 8/2002 | Lesczynski et al. | |
| 6,444,145 B1 | 9/2002 | Clutterbuck | |
| 6,502,876 B1 | 1/2003 | Stockhorst et al. | |
| 6,511,617 B1 | 1/2003 | Martin et al. | |
| 6,551,531 B1 | 4/2003 | Ford et al. | |
| 6,565,776 B1 | 5/2003 | Li et al. | |
| 6,627,124 B1 | 9/2003 | Herbrechtsmeier et al. | |
| 6,638,362 B2 | 10/2003 | Dobner et al. | |
| 6,638,451 B1 | 10/2003 | Hagmann et al. | |
| 6,719,929 B2 | 4/2004 | Winterton et al. | |
| 6,790,873 B2 | 9/2004 | Tomono et al. | |
| 6,867,245 B2 | 3/2005 | Iwata et al. | |
| 6,869,549 B2 | 3/2005 | Ansell et al. | |
| 6,939,487 B1 | 9/2005 | Ajello et al. | |
| 7,044,429 B1 | 5/2006 | Foreman et al. | |
| 7,135,139 B2 | 11/2006 | Kanematsu et al. | |
| 2002/0069896 A1 | 6/2002 | Pankow | |
| 2002/0185763 A1 | 12/2002 | Pegram et al. | |
| 2003/0062640 A1 | 4/2003 | Ansell et al. | |
| 2003/0160343 A1 | 8/2003 | Hodgkinson | |
| 2003/0164562 A1 | 9/2003 | Li et al. | |
| 2003/0164563 A1 | 9/2003 | Calvin et al. | |
| 2003/0197833 A1 | 10/2003 | Hiratani et al. | |
| 2004/0000732 A1 | 1/2004 | Spaulding et al. | |
| 2004/0074525 A1 | 4/2004 | Widman et al. | |
| 2005/0062179 A1 | 3/2005 | Rastogi et al. | |
| 2005/0206019 A1 | 9/2005 | Hodgkinson | |
| 2005/0212155 A1 | 9/2005 | Matsuzawa et al. | |
| 2006/0051454 A1 | 3/2006 | Ansell et al. | |
| 2006/0097415 A1 | 5/2006 | Watterson, Jr. et al. | |
| 2006/0186564 A1 | 8/2006 | Adams et al. | |
| 2006/0202367 A1 | 9/2006 | Knutzen et al. | |
| 2006/0202368 A1 | 9/2006 | Matsuzawa et al. | |
| 2007/0035049 A1 | 2/2007 | Bruce et al. | |
| 2007/0231293 A1 | 10/2007 | Vanderlaan et al. | |
| 2010/0052194 A1* | 3/2010 | Reynolds et al. ............... 264/1.1 | |

FOREIGN PATENT DOCUMENTS

| | | | |
|---|---|---|---|
| EP | 1 078 732 A2 | 2/2001 | |
| EP | 1078732 A2 | 2/2001 | |
| EP | 1 268 172 B1 | 5/2004 | |
| JP | A-H04-005010 | 1/1992 | |
| JP | A-H09-024521 | 1/1997 | |
| JP | A-H11-240030 | 9/1999 | |
| JP | A-2003-212940 | 7/2003 | |
| JP | A-2005-313452 | 11/2005 | |
| JP | 2008155504 A | 7/2008 | |
| WO | WO 2008/074541 A1 | 6/1926 | |
| WO | WO 95/11789 | 5/1995 | |
| WO | WO 00/12291 A1 | 3/2000 | |

OTHER PUBLICATIONS

PCT Written Opinion completed Sep. 14, 2007 and mailed Jan. 23, 2008 from related PCT Application No. PCT/US2007/069679, filed May 24, 2007 (6 pages).

International Preliminary Report on Patentability issued Dec. 3, 2008 and mailed Dec. 18, 2008 from related PCT Application No. PCT/US2007/069679, filed May 24, 2007 (6 pages).

Partial European Search Report in related European Application No. EP 06016469 dated May 21, 2010 (6 pages).

International Search Report in related International Application No. PCT/US2006/030497, filed Aug. 7, 2006 (4 pages).

Notice of Allowance mailed Jun. 7, 2010 from related U.S. Appl. No. 11/752,877, filed May 23, 2007.

Advisory Action mailed Dec. 30, 2009 from related U.S. Appl. No. 11/752,877, filed May 23, 2007.

Final Office Action mailed Oct. 16, 2009 from related U.S. Appl. No. 11/752,877, filed May 23, 2007.

Office Action mailed Apr. 13, 2009 from related U.S. Appl. No. 11/752,877, filed May 23, 2007.

Office Action mailed Feb. 2, 2009 from related U.S. Appl. No. 11/752,877, filed May 23, 2007.

Office Action mailed Mar. 29, 2010 from related Japanese Application No. 2007-171187 (3 pages).

English translation of Office Action mailed Mar. 29, 2010 from related Japanese Application No. 2007-171187 (3 pages).

Office Action mailed Apr. 16, 2010 from related Taiwanese Application No. 096119535 (4 pages).

English translation of Office Action mailed Apr. 16, 2010 from related Taiwanese Application No. 096119535 (4 pages).

Office Action mailed Nov. 23, 2010 from related U.S. Appl. No. 11/201,410, filed Aug. 9, 2005.

Final Office Action mailed Aug. 6, 2010 from related U.S. Appl. No. 11/201,410, filed Aug. 9, 2005.

Office Action mailed Mar. 2, 2010 from related U.S. Appl. No. 11/201,410, filed Aug. 9, 2005.

Advisory Action mailed Dec. 9, 2009 from related U.S. Appl. No. 11/201,410, filed Aug. 9, 2005.

Final Office Action mailed Aug. 31, 2009 from related U.S. Appl. No. 11/201,410, filed Aug. 9, 2005.

Office Action mailed Jan. 23, 2009 from related U.S. Appl. No. 11/201,410, filed Aug. 9, 2005.

U.S. Appl. No. 11/200,848, filed Aug. 9, 2005.
U.S. Appl. No. 11/200,648, filed Aug. 9, 2005.
U.S. Appl. No. 11/200,644, filed Aug. 9, 2005.
U.S. Appl. No. 11/200,863, filed Aug. 9, 2005.
U.S. Appl. No. 11/200,862, filed Aug. 9, 2005.
U.S. Appl. No. 11/201,409, filed Aug. 9, 2005.
U.S. Appl. No. 60/604,961, filed Aug. 27, 2004.
U.S. Appl. No. 60/621,525, filed Oct. 22, 2004.

International Search Report completed Apr. 27, 2011 and mailed Apr. 28, 2011 from corresponding International Application No. PCT/US2010/044406 filed Aug. 4, 2010 (5 pages).

Written Opinion completed Apr. 27, 2011 and mailed Apr. 28, 2011 from corresponding International Application No. PCT/US2010/044406 filed Aug. 4, 2010 (4 pages).

* cited by examiner

DEMOLDING OF OPHTHALMIC LENSES DURING THE MANUFACTURE THEREOF

CROSS-REFERENCED TO RELATED APPLICATION

This is a regular utility application of Provisional Application Ser. No. 61/238,565, filed Aug. 31, 2009, the contents of which are expressly incorporated herein by reference.

FIELD

The present invention relates to methods, devices, and systems used in the manufacture of ophthalmic lenses, such as contact lenses. More specifically, methods, devices, and systems for demolding ophthalmic lenses using a puncher to separate two mold halves are described.

BACKGROUND

Injection-molded ophthalmic lens mold assemblies used in the manufacture of cast molded contact lenses, such as hydrogel and silicone hydrogel contact lenses, typically require a demolding step to open or separate the male and female mold halves after the lens has been formed in the mold assembly. The formed lens remains attached to one of the mold halves, and then is separated therefrom and further processed.

A number of techniques for separating two mold sections are known in the art. One demolding technique is referred to as decapping, which involves mechanical devices for physically separating the two mold sections. One approach in decapping is the application of lateral forces against the outer perimeter of a mold assembly to cause deformation to either the male or female mold to then break the seal force that hold them together. Another approach is the use of one or more wedges to separate the space between the two mold sections to pry them apart.

SUMMARY

New methods, devices, and systems for manufacturing molded ophthalmic lenses, such as contact lenses, are described. The present methods utilize ophthalmic lens demolders to separate the mold parts of an ophthalmic lens mold assembly so that the molded ophthalmic lens can be removed from one of the mold parts and further processed. The present methods, devices, and systems are useful in demolding lens mold assemblies by separating a male mold part from a female mold part using a punching technique. It can be understood that the male mold part includes a convex molding surface that corresponds to the back surface of the ophthalmic lens, and therefore can be referred to as a back surface mold, and that the female mold part includes a concave molding surface that corresponds to the front surface of the ophthalmic lens, and therefore can be referred to as a front surface mold. With the present methods, devices, and systems, it is possible to demold a lens mold assembly by puncturing through a mold layer of one mold part to then push against a mold layer of another mold part to separate the two in a demolding process.

The methods disclosed herein include a method comprising placing a lens mold assembly comprising a first mold part and a second mold part under a puncher. The lens mold assembly contains a molded ophthalmic lens, such as a molded contact lens. The puncher comprises at least one punch pin. The at least one punch pin comprises a tip. At a high level, the present method involves moving the puncher along an axis within a cylinder defined by the lens mold assembly and puncturing through a surface layer of the first mold. The method then includes pushing against a surface layer of the second mold part after the first mold part is punched through to separate the second mold part from the first mold part.

Another example of the methods disclosed herein includes a method in which a puncher comprising at least one punch pin extending beyond a distal end of a punch body is moved through an opening of a stripper device for stripping a lens mold part. The method further includes stopping the moving step before the puncher reaches a support palette configured for supporting a lens mold assembly and then returning the puncher to a position that requires the puncher to move back through the opening of the stripper device.

A still further feature of the present invention relates to an ophthalmic lens demolder comprising a puncher that comprises a punch body comprising a punch bore. A punch pin comprising a pin tip is located in the punch bore such that the pin tip extends beyond a distal end of the punch body. The demolder further includes a support plate structured for supporting at least one part of a two part mold assembly to be demolded and wherein the punch pin is sized and moved with sufficient force to puncture through a mold layer of a lens mold assembly for demolding.

In another example, a puncher is provided for use with the system for demolding.

An additional feature of the present invention is a puncher for punching through a flange layer of a mold part using one or more than one punch pins.

In a still further example, a stripper column is used with a puncher and wherein the puncher is both movable with the stripper column and movable relative to the stripper column.

An additional example of the present invention relates to the manufacture of ophthalmic lens demolders, as described herein.

Various examples of the present invention are described in detail in the detailed description and claims below. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any example of the present invention.

DETAILED DESCRIPTION

The detailed description set forth below in connection with the appended drawings is intended as a description of examples of ophthalmic lens mold assembly demolders provided in accordance with the present invention and is not intended to represent the only forms in which the present invention may be constructed or utilized. The description sets forth the features and the steps for constructing and using the demolders in connection with the illustrated examples. It is to be understood, however, that the same or equivalent functions and structures may be accomplished by different examples that are also intended to be encompassed within the spirit and scope of the invention.

Figure 1:
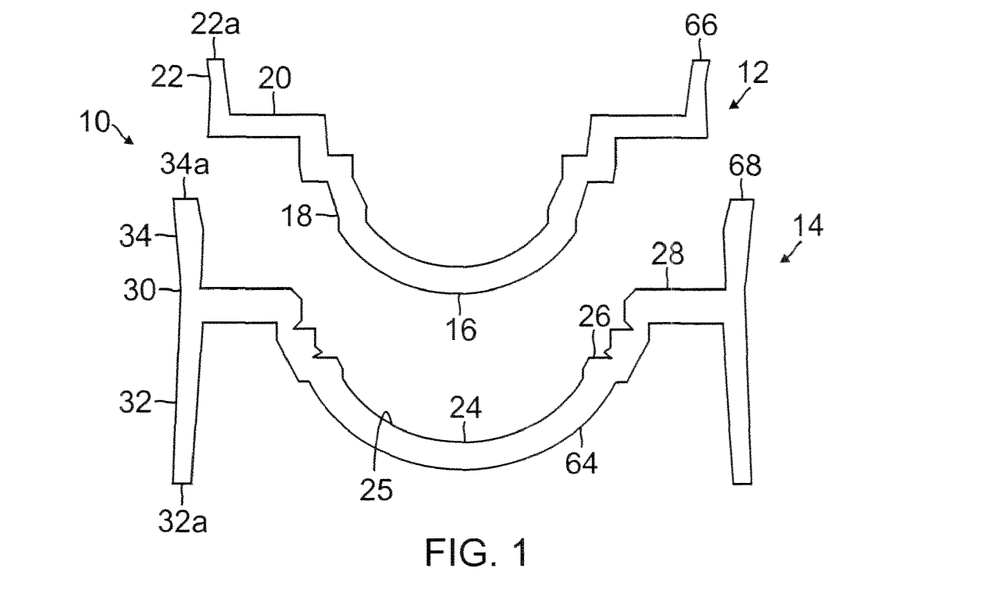
FIG. 1 is a schematic cross-sectional side view of an ophthalmic lens mold assembly.
Figure 2:
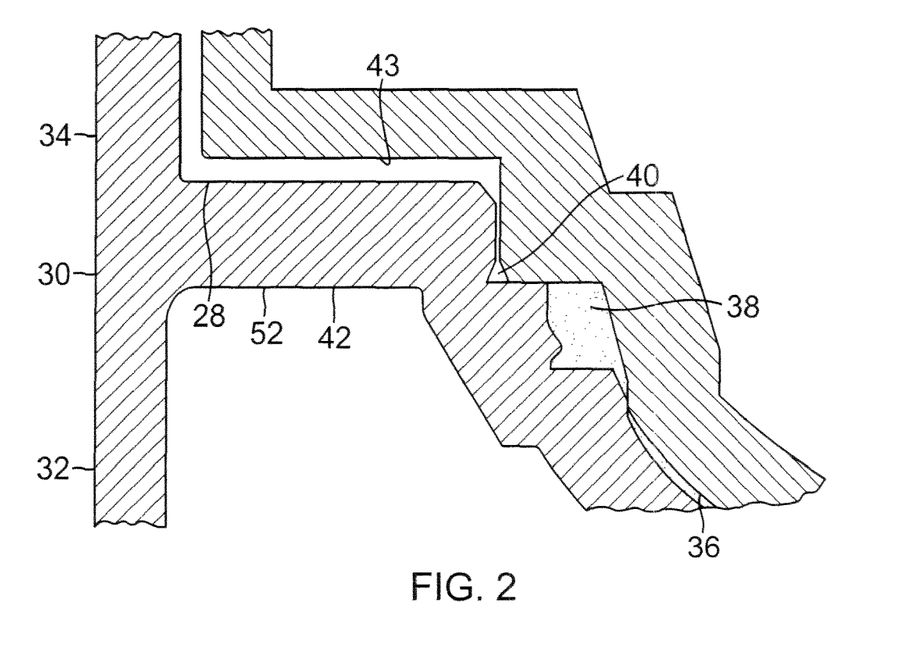
FIG. 2 is a partial cross-sectional side view of the mold assembly of FIG. 1 in an assembled state.

FIGS. 1 and 2 schematically illustrate a representative ophthalmic lens mold assembly 10 for use with the present methods, systems, and apparatus for demolding an ophthalmic lens mold assembly. The mold assembly 10 comprises a male mold part or half 12 and a female mold part or half 14 and is the subject of U.S. Pat. No. 6,405,993, the contents of which are expressly incorporated herein by reference as if set forth in full. Broadly speaking, the male mold part 12 comprises a convex lens forming surface 16, a mechanical engagement region 18, an annular surface region or male flange region 20, and a skirt section 22, which may be referred to as a rim or rib, having an axial end 22a.

The female mold part 14 comprises a concave lens forming surface 24, an overflow and mechanical engagement region 26, an annular surface region or female flange region 28, and a cylindrical wall 30, which is transacted by the annular surface region 28 into a first rib or rim region 32 having a first axial end 32a and a second rib or rim region 34 having a second axial end 34a.

The male and female mold parts may be formed from polypropylene by injection molding and the mold assembly 10 may be understood to have a mold center having an axis that runs through the center of both mold halves. Other thermoplastic resins suitable for injection molding may be used, such as polystyrene resins.

The ophthalmic lens mold assemblies useful with the present ophthalmic lens mold assembly demolders and related methods can be used in the cast or static molding of ophthalmic lenses. For purposes of convenience, the present disclosure will refer to contact lenses as an illustrative example of an ophthalmic lens.

With reference to FIG. 2, which is a partial cross-sectional side view of the mold assembly of FIG. 1 showing the male mold part 12 engaged to the female mold part 14, the convex lens forming surface 16 and the concave lens forming surface 24 together define a lens forming recess or lens forming cavity 36. In casting an ophthalmic lens body, a polymerizable composition is first deposited on the concave lens forming surface region 25 of the female mold part 14. The polymerizable composition contains reactive compounds suitable to form polymerized ophthalmic lenses or contact lenses. In certain examples, the lenses are hydrogel lenses (e.g., they are able to absorb and retain water in an equilibrium state). In additional examples, the lenses are silicone hydrogel lenses (e.g. silicone containing lenses that are able to absorb and retain water in an equilibrium state). The composition may also contain additional ingredients, such as polymerization initiators, cross-linking agents, ultraviolet blocking agents, tinting agents, wetting agents, the like, and combinations thereof. After placing the polymerizable composition on the female mold part 14, the male mold part 12 is then engaged with the female mold part 14 to trap a sufficient amount of the polymerizable composition in the lens forming recess 36.

Exposing the polymerizable composition to heat or light, such as UV light, initiates a polymerization reaction, and the polymerizable composition reacts to form a polymeric lens body in the lens forming recess 36. Thus, the polymeric lens body formed in the mold assembly can comprise a hydrogel contact lens body, including a silicone hydrogel contact lens body. The male and female mold parts 12, 14 are now ready for demolding to reveal the ophthalmic lens body formed in the lens forming recess 36.

Radially outward relative to the two overflow cavities 38, 40 are the two annular regions or flanges 20, 28 of the male and female parts, respectively. As shown in FIG. 2 by the arrow 42 on the female flange 28 and a corresponding flange region 43 above the arrow on the male flange 20, a separation region 42 is provided for separating the male mold part 12 from the female mold part 14, as further discussed below. The separation point or points at the separation region 42 may be referred to as a target or puncture point or points 52 and the corresponding flange region 43 may be referred to as an impact point or push point for reasons further discussed below. Alternatively, the separation region 42 and the target or puncture point or points 52 can be points on the male mold flange 20, and the impact point or push points can be points on the female mold flange 28 (not illustrated). Depending on the number of punctures used to separate each mold assembly, there may be one set of puncture and impact points 52, 43 or more than one, such as three or four sets located along the impact region 42.

Figure 3:
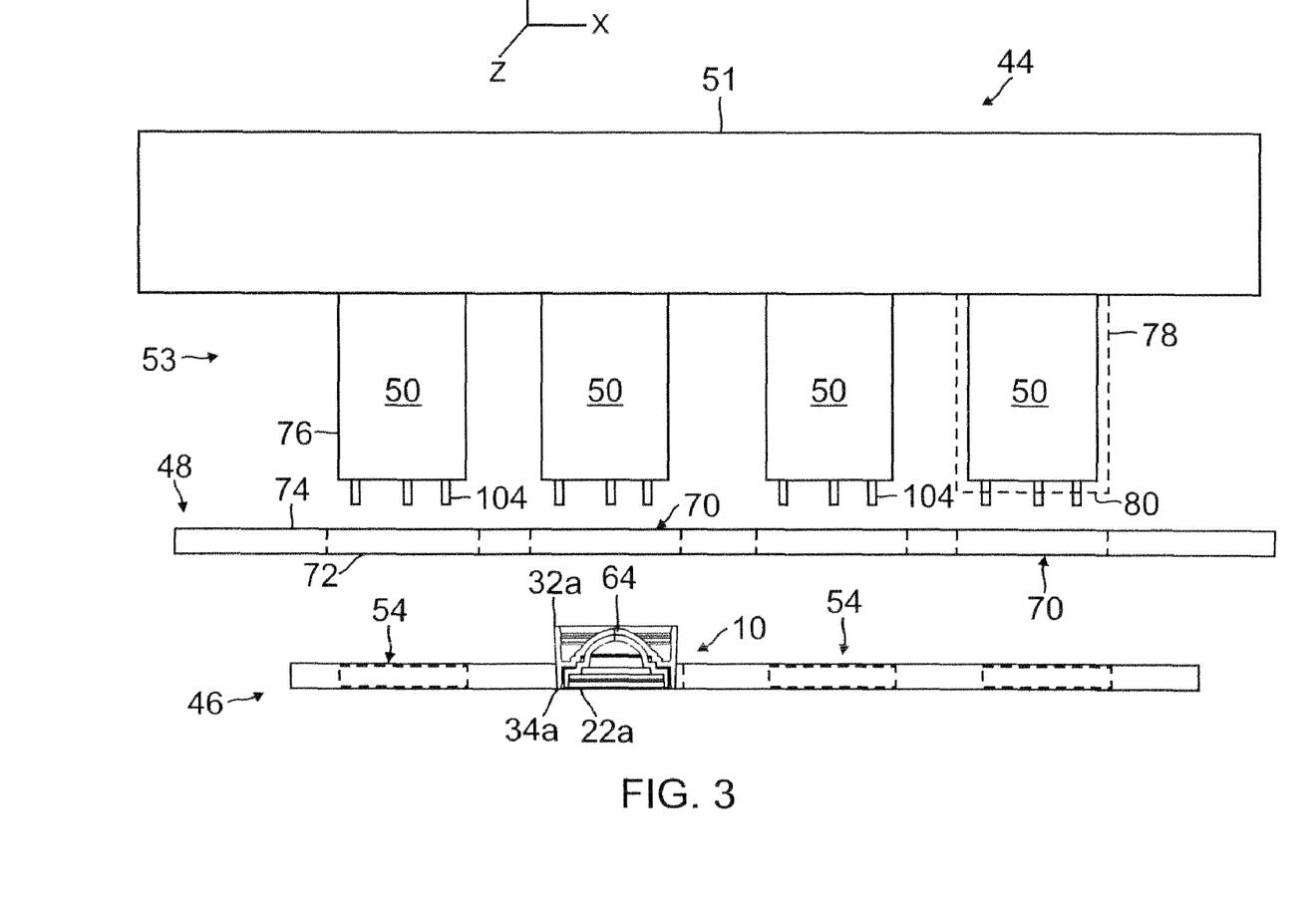
FIG. 3 is a schematic view of an ophthalmic lens mold assembly demolder provided as described herein.

FIG. 3 schematically illustrates an ophthalmic lens mold assembly demolder, which is generally designated 44. The assembly or demolder 44 is configured to concurrently demold a plurality of mold assemblies 10, such as two or more, for example six, or only one at a time by limiting the number of punchers installed in the assembly or activated in the assembly to one or by loading only a single mold assembly 10 for demolding. In one example, the assembly 44 comprises a loading palette or plate 46 for receiving a plurality of lens mold assemblies 10 for demolding, a stripper plate 48 for stripping the mold parts or mold halves following a punching operation, and a plurality of punchers 50 for punching the separation regions 42 of the plurality of mold assemblies to separate the molds, as further discussed below. In a particular example, the plurality of punchers 50 are mounted on a header 51 which is in turn connected to a single axis movable carriage (not shown) for moving the header and the punchers along a y-axis. The carriage may embody any number of conventional devices for traversing along an axis to move the punchers against the mold assemblies and then subsequently returning to a position for loading new mold assemblies. For example, the carriage may embody a single axis robot arm, a rack and pinion gear drive system, an actuating cylinder drive system using pressurized gas or fluid, and one or more springs for dampening and/or returning the header to the loading position. The plurality of punchers 50, or one puncher in a single mold operation, may collectively be referred to as a punch header 53. As illustrated in FIG. 3, the loading palette or plate 46 is configured to load the lens mold assemblies 10 with the male mold part 12 below the female mold part 14, although other configurations are possible such as, for example, the female mold part 14 below the male mold part 12.

Figure 4:
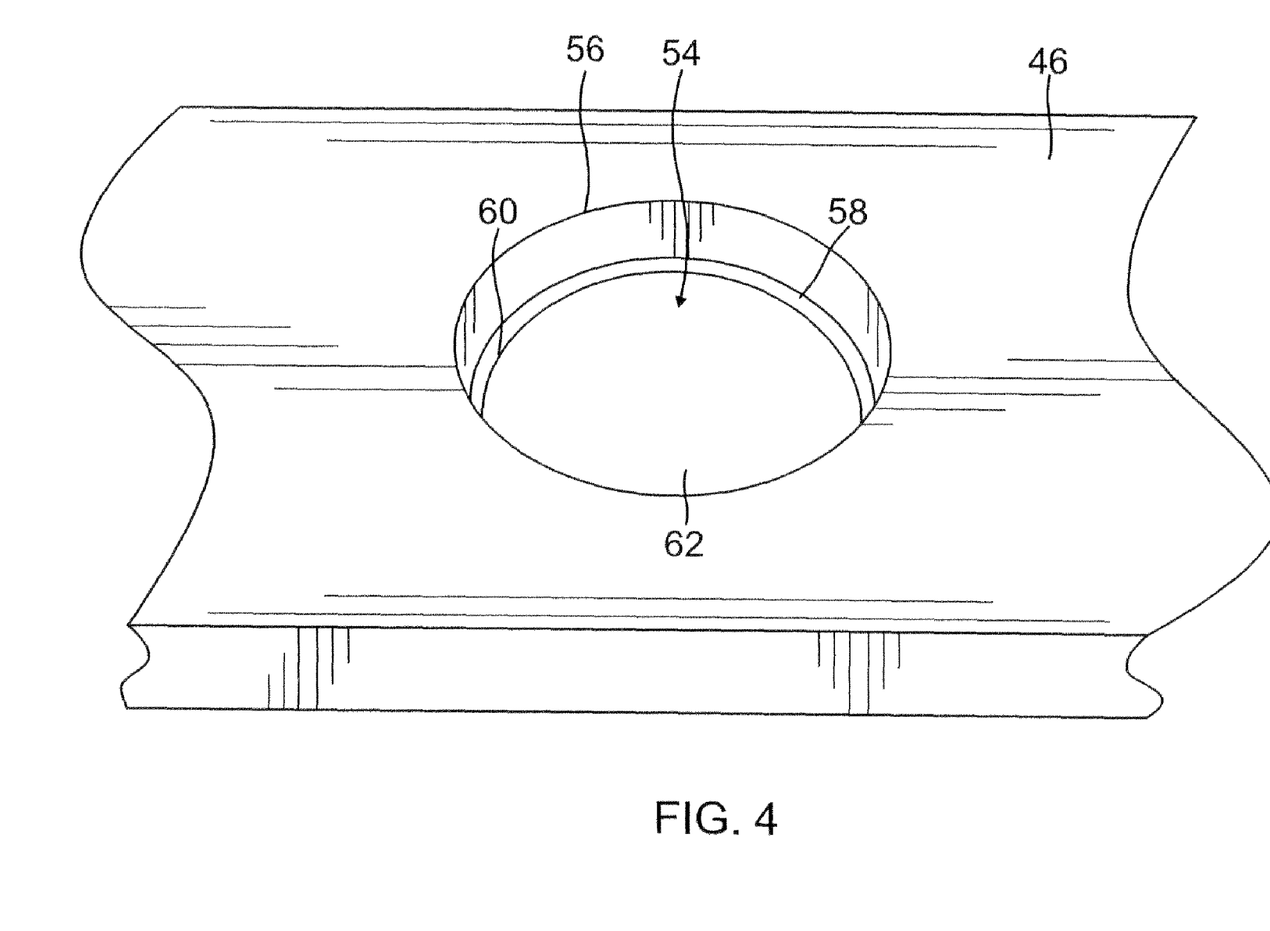
FIG. 4 is a partial enlarged perspective view of the loading palette or plate of FIG. 3.

With reference now to FIG. 4 in addition to FIGS. 1 and 3, a partial view of the loading palette 46 for receiving a plurality of mold assemblies 10 for demolding comprising a plurality of receiving bores 54 is shown. The number of bores 54 preferably corresponds to the number of punchers 50 to be used and hence the number of lens molds to be de-molded at the same time. As shown, the bore 54 comprises a bore opening 56 having a bore diameter and a flange 58 having a flange perimeter and a flange diameter 60, which is smaller than the bore diameter. The flange perimeter 60 defines a through opening 62 that extends through the palette 46. As illustrated in FIG. 3, in use, the receiving bore 54 is configured to receive a mold assembly, wherein a mold assembly is placed into the receiving bore 54 with portion of the mold assembly containing the rib axial ends 22a and 34a being placed first into the receiving bore 54. Thus, in the example illustrated in FIGS. 3 and 4, once positioned, the mold assembly 10 would have its outer convex surface 64 of the female mold part 14 pointed towards the punchers 50, as shown in FIG. 3. Alternatively, the receiving bore 54 can be configured to receive a mold assembly to be loaded from a rib axial end 32a first.

With reference again to FIGS. 1 and 4, the rib 22 on the male mold part 12, which is a generally cylindrical structure, has a rib diameter 66, measured from edge to edge at the rib axial end 22a taken along the largest measurement. The rib diameter 66 is smaller than the flange diameter 60 of the receiving bore 54 so when the male mold part 12 is separated from the female mold part 14, as further discussed below, the male mold part falls through the through opening 62 of the loading palette 46 and is collected below for further processing. Alternatively, the male mold part 12 can be designed to have a rib 22 sized such that, when the male mold part is engaged with the female mold part 14, the rib skirt axial end 22a extends above the second axial end 34a of the female mold, and the rib diameter 66 of the male mold part 12 is greater than a wall diameter 68 measured edge to edge of the female mold part 14. In this example, the wall diameter 68 is smaller than the flange diameter 60 of the receiving bore 54 so that when the male mold part 12 is separated from the female mold part 14, the female mold part falls through the through opening 62 of the loading palette 46 and is collected below for further processing.

As illustrated in FIGS. 1-3, the cylindrical wall 30 similarly has a wall diameter 68 measured from edge to edge at the second rib axial end 34a taken along the largest measurement. The wall diameter 68 is smaller than the bore opening 56 of the receiving bore 54 but larger than the flange opening 60 so that when the mold assembly 10 is placed into the receiving bore (FIG. 3), the second axial end 34a of the female mold part 14 is supported by the flange 58 but not the rib axial end 22a of the male mold part 12. Alternatively, for different lens mold assembly configurations as discussed above, it can be the axial end 22a of the male mold part 12 that is supported by the flange 58 of the loading palette 46, but not an axial end of the female mold part 14. In one example, the loading palette 46 is made from a hard plastic material. However, other materials such as aluminum or steel may be used without deviating from the spirit and scope of the present invention.

When the loading palette or plate 46 is loaded with one or more mold assemblies 10 for demolding, the palette may be referred to as a loaded palette, which is ready to be acted on by the punchers 50, as further discussed below. The palette 46 may be manually loaded with mold assemblies or may be machine loaded, such as with a pick-and-place device or a specially designed loading machine. In still other examples of the present invention, a conveyor system (not shown) may be used to transport a plurality of loaded palettes under the punch header 53, one at a time, for punching to separate the mold halves, as further discussed below. Once punched, the conveyor system moves the spent palette out of the way and a loaded palette in place for punching.

Thus, an example of the present invention is understood to include a combination palette comprising at least one receiving bore comprising a flange defining a through opening and a mold assembly comprising an inner rim and an outer rim, and wherein the mold assembly is positioned inside the receiving bore such that the outer rim is supported by the flange but not the inner rim. In an example, the mold assembly is positioned inside the receiving bore such that an outer convex surface of a female mold part is facing or pointing away from the through opening. In another example, the mold assembly is positioned subjacent a puncher for punching through a first flange layer of a two-part mold assembly to demold the mold assembly, as further discussed below.

Referring again to FIG. 3, the stripper plate 48, like the loading palette 46, comprises a plurality of through bores 70, for example two or more bores or a corresponding number of bores as the receiving bores 54 of the loading palette 46 or the same number of as the number of punchers 50 on the punch header 53. As illustrated in FIG. 3, the through bores 70 each comprises a bore opening 72 having a bore diameter 74 that is smaller than the wall diameter 68 of the female mold part 14 but larger than the puncher diameter 76 of the puncher 50. Thus, the through bore 70 is configured to allow a puncher 50 to pass therethrough but not the wall 30 of the female mold part 14. During use, as further discussed below, a puncher 50 passes through the through bore 70 to separate the male mold part 12 from the female mold part 14 then retracts. As the puncher retracts, the female mold part 14 moves with the puncher until it hits the stripper plate 48 due to the relative sizes of the through bore 70 and the wall diameter 68 of the female mold part 14. The puncher then moves to its loading or some retracted position above the stripper plate while the female mold part falls towards the loading palette 46 to be removed manually or by a collection or sweeping device. Alternatively, the through bores 70 of each can comprise a bore opening 73 having a bore diameter 74 that is smaller than the rib diameter 66 of the male mold part 12 but larger than the puncher diameter 76 of the puncher 50. In this configuration, the through bore 70 is configured to allow a puncher 50 to pass therethrough but not the rib 22 of the male mold part 14. During use of this configuration, a puncher 50 pass through the bore 70 to separate the male mold part 12 from the female mold part 14 then retracts. As the puncher retracts, the male mold part 12 moves with the puncher until it hits the stripper plate 48 due to the relative sizes of the through bore 70 and the rib diameter 66 of the male mold part 12. The puncher then moves to its loading or some retracted position above the stripper plate while the male mold part falls towards the loading palette 46 to be removed manually or by a collection or sweeping device.

In an example, the stripper plate 48 is made from a hard plastic material or from steel and is held stationary, elevation wise, relative to the ground or to the loading palette. In another example, the stripper plate 48 is secured to a frame that holds the header 51. Although the stripper plate 48 is fixed in place above the loading palette 46 for stripping the female mold parts 14 or male mold parts 12, it may traverse in and out of position to make clearance for cleaning and/or loading mold assemblies or loaded palettes. In this example, the stripper plate 48 is configured to move into position below the plurality of punchers 50 prior to retracing the punch header 53 and following a punching operation.

In another example of the present invention, during the demolding process, the female mold part 14 or the male mold part 12 can be held fixed into a nest in the proper orientation as required for a puncher/stripper assembly, and the puncher/stripper assembly can be moved to approach the nested female mold part 14 or male mold part 12, so that the stripper plate holds the nested mold part in a fixed position during the demolding process. During the demolding process, the puncher moves between its forward and retracted positions, puncturing the nested mold part and separating the first and second mold members (i.e., demolding the male mold part 12 from the female mold part 14) while the nested mold part remains static in its fixed in position held between the stripper plate and the nest.

In yet another example of the present invention, pluralities of individual stripper columns 78 (shown in dashed lines, FIG. 3) are incorporated around each puncher 50. Stripper columns 78 may be used as an alternative to a stripper plate 48 for stripping the female mold parts 14 or the male mold parts 12. In an example, a stripper column comprises a cylindrical housing having a housing diameter 80 mounted over a puncher 50. After a mold assembly 10 is punched and retracted by moving the puncher 50 relative to the cylindrical housing 78, the female mold part 14 or male mold part 12 is stripped when it is pulled against the opening of the housing 78. Further discussions regarding the stripper column 78 are discussed below with reference to FIGS. 13 and 14.

Thus, an example of the present invention is understood to include a demolding assembly comprising a puncher aligned with a bore opening 70 of a stripper device 48 and a receiving bore 54 of a loading palette 46. In one specific example, a mold assembly comprising a male mold part and a female mold part is positioned between the bore opening of the stripper device and the receiving bore of the loading palette for demolding by a puncher. Another example is understood to include a mold assembly positioned between a stripper device comprising a bore opening and a loading palette comprising a bore opening, and wherein the female mold part 14 or the male mold part 12 of the mold assembly is limited from moving through either bore opening.

Referring now to FIGS. 5-10, an exemplary puncher 50 in various views is provided. Referring initially to FIGS. 7-10, the exemplary puncher 50 comprises a punch top 84 and a punch bottom 86, which may be cast or machined from a metal material, such as from aluminum, steel, or steel alloy. The punch top 84 comprises a body 88 comprising a flange 90 and a socket 92. The flange 90 is configured to mate or abut against a surface on a header 51 (FIG. 3) while the socket 92 is configured to receive a stub or stem (not shown) projecting from the header. The body 88 is held to the stub by a lock nut or may alternative be threaded to the stub. Externally, the body 88 may incorporate turning surfaces 94, similar to turning surfaces on a hex nut, for gripping and turning by a tool or a wrench. Alternatively, the body 88 may incorporate a stub or a stem for projecting into a socket located on the header.

Figure 8:
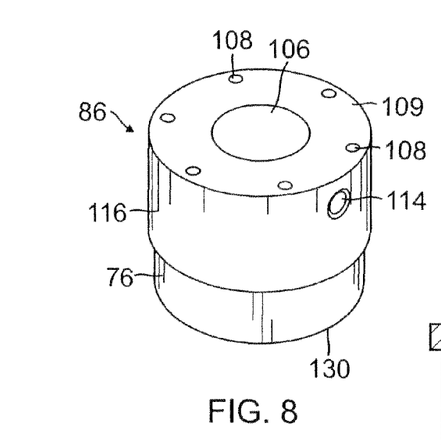
FIG. 8 is a perspective view of a punch bottom of the ophthalmic lens demolder of FIG. 3.
Figure 9:
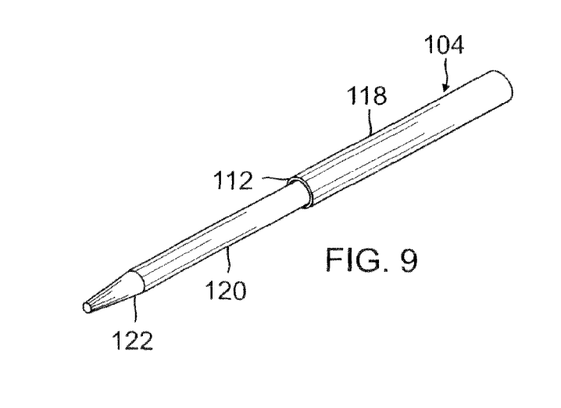
FIG. 9 is a perspective view of a punch pin of the ophthalmic lens demolder of FIG. 3.

A male stem 96 is incorporated at the distal end 98 of the body 88 and comprises an optional relief point or recessed area 100 for engagement by a lock nut (not shown) located on the punch bottom, which may be used for securing the punch bottom to the punch top as further discussed below with reference to FIG. 8. In another example, the male stem 96 can comprise an extruded boss design for precision alignment of the punch top 84 and the punch bottom 86, with the recessed area 100 providing a groove to allow the body 88 to be fit in place using a setscrew. Such a configuration can permit quick release of the punch bottom 86 from the punch top 86 when needed for pin maintenance. The male stem 96 extends distally of a shoulder 102 for supporting a plurality of punch pins 104, which comprises an upper pin section 118, a central pin section 120, a stepped shoulder 112 separating the two sections, and a tapered or frusto-conical tip section 122. The tip of the pin is configured in a manner so as to allow the tip of the pin to puncture the first mold member. For example, as previously noted, the tip can be tapered, or the tip can be rounded, the tip can have a straight bore with a flat or rounded tip, the tip can be tapered with a flat or rounded tip, etc. The tip section 122 can be sufficiently pointed or rounded to allow the pin to puncture through the flange section 28 of the female mold part 14, as illustrated and as further discussed below. Alternatively, the tip section 122 can be sufficiently pointed or rounded to puncture through the flange section 20 of the male mold part 12. The configuration of the tip section 122 that is required for the tip section 122 to puncture through a flange section of a mold part (e.g., the amount of pointing or rounding required) depends on factors such as the material used for the mold parts, the polymerizable composition used to mold the contact lens body, the force applied to the at least one punch pin 104, the diameter of the punch pin 104, etc., as understood by one of skill in the art. In one example, the male stem 96 comprises a tapered corner to facilitate insertion into a socket 106 located on a punch bottom.

Figure 5:
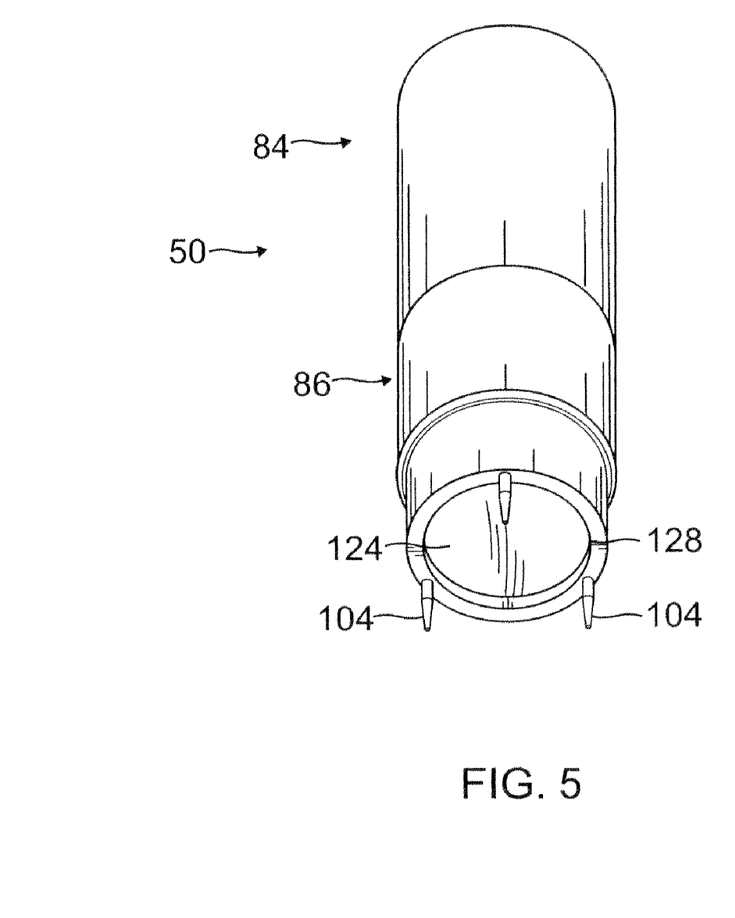
FIGS. 5 and 6 are perspective and cross-sectional side views, respectively, of a puncher of the ophthalmic lens mold assembly demolder of FIG. 3.
Figure 6:
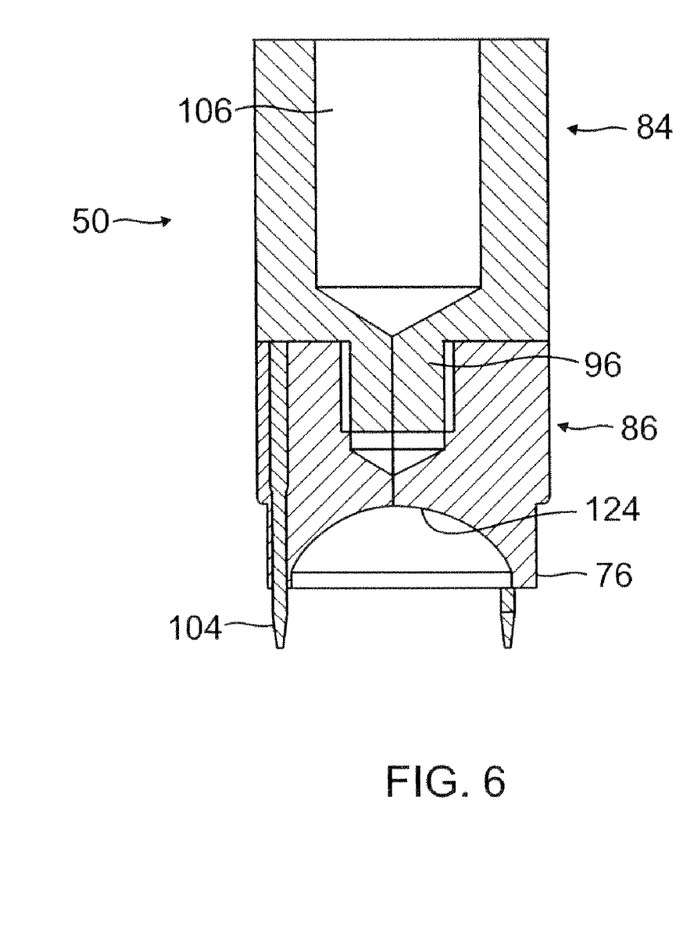
Figure 7:
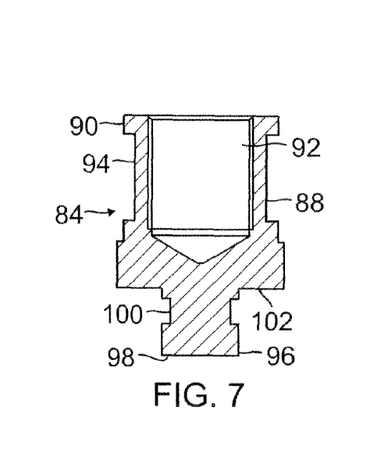
FIG. 7 is a cross-sectional side view of a punch top of the ophthalmic lens demolder of FIG. 3.
Figure 10:
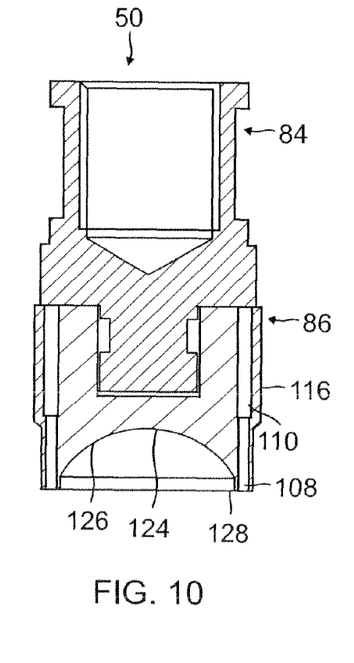
FIG. 10 is a cross-sectional side view of the punch bottom of FIG. 8 engaged to the punch top of FIG. 7.

The punch bottom 86 is configured receive a plurality of punch pins 104 and mate with the punch top 84 as shown in FIG. 10 to form a puncher 50 (See also FIGS. 5 and 6). In an example, the punch bottom 86 is machined or cast with a socket 106 and six spaced apart pin bores 108 with fewer or more pin bores contemplated. The pin bores 108 may be evenly spaced apart from one another or non-uniformly spaced about a pattern that corresponds to the shape of a separation region 42 (FIG. 2) of a lens mold assembly, which typically has a cylindrical profile. The punch bottom 86 may be loaded with one punch pin 104 or up to six punch pins 104 in the six punch bores 108. In the example illustrated in the FIGS, this allows the pins, when punched, to drive through the annular region 28 of the female mold part 14 and push against the annular region 20 of the male mold part 12 to separate the two, as further discussed below. Alternatively, when punched, the pins can drive through the annular flange region 20 of the male mold part 12 and push against the annular region 28 of the female mold part 14 to separate the two. Each bore 108 is sized to receive a punch pin 104 from the inlet end 109 and incorporates an internal shoulder 110 for axial registration with the stepped shoulder 112 located on the punch pin 104. In another example, the punch pins are inserted from the distal end 130 and held secured thereto by slight interference fit. A threaded bore 114 for a lock nut or setscrew (not shown) is incorporated on a side surface of the body section 116 to secure the punch bottom 86 with the stem 96 located on the punch top 84.

With reference again to FIG. 10, the body section 116 of the lower puncher 86 further incorporates a partially spherical concave surface region 124. In a particular example, the concave surface region 124 is contoured to match the outer convex surface 64 of the female mold part 14. Thus, with reference to FIG. 3, when the puncher 50 is lowered against the mold assembly 10 to demold the mold assembly, the partially spherical concave surface region 124 overlies the outer convex surface 64 of the female mold part 14 but does not compress or otherwise deflect, deform, or distort the outer convex surface 64 during demolding to not damage the ophthalmic lens body in the lens forming recess of the lens mold assembly. The central concave surface region 126 and the tip section 122 of the pins should be positioned relative to the end edge 128 of the punch bottom 86 in such a way so that the pins puncture through the impact points 43 at the separation region 42 of the lens mold assembly 10 before the concave surface region 124 contacts the outer convex surface 64 of the female mold part 14. Alternatively, the lower puncher 86 can incorporate a partially spherical convex surface region (not illustrated). For example, the convex surface region can be contoured to match the outer concave surface of the male mold. In this alternative, when the puncher 50 is lowered against the mold assembly 10 to demold the mold assembly, the partially spherical convex surface region overlies the outer concave surface of the male mold part 12 but does not compress or otherwise deflect, deform, or distort the outer concave surface during demolding to not damage the ophthalmic lens body in the lens forming recess of the lens mold assembly. The central convex surface region and the tip section 122 of the pins should be positioned relative to the end edge 128 of the punch bottom 86 in such a way so that the pins puncture through the impact points 43 at the separation region 42 of the lens mold assembly 10 before the convex surface region contact the outer concave surface of the male mold part 12.

Returning now to FIGS. 5 and 6, a schematic perspective view of the puncher 50 and a partial cross-sectional side view of the same puncher are shown. As shown, three punch pins 104 are present. However, fewer than three or up to the number of punch holes 108 incorporated in the punch bottom 86 may be provided. Also, while the puncher 50 is formed from a punch top and punch bottom and a plurality of punch pins, more or fewer components may be used to form the puncher, such as making the punch top from two components and the punch bottom from 2 components.

Thus, as shown and described, an example of the present includes a puncher comprising a tip section having a tapered or rounded tip extending distally of an end edge of a punch bottom for demolding a lens mold assembly. In an example, the puncher 50 includes a mounting end for mounting to a header or a carriage and a punch end comprising at least one punch pin comprising a tapered or rounded tip. In another example, the puncher comprises a plurality of pins distributed about a generally circular pattern for punching a separation region of a lens mold assembly. In one particular example, the puncher is assembled from a punch top and a punch bottom and held together by a threaded nut.

In still yet another example, a system is provided for demolding a lens mold assembly. The system is understood to include a puncher positioned above a loading palette comprising a lens mold and movable axially along a mold center axis to demold the mold assembly.

A further feature of the puncher 50 provided in accordance with the present invention includes a provision for mounting a plurality of punch pins from a mid-point, such as from the end 109 of a punch bottom 86. To prevent unnecessarily deforming the lens mold assembly during demolding, the puncher is understood to be structured to not distort the lens forming concave and convex surfaces of the lens mold. In a particular example, the puncher incorporates a partially spherical concave surface region 124 at the distal end 130 of the lower puncher 86 to overlie the outer convex surface 64 of the female lens mold part 14 during demolding. In another particular example, the puncher incorporates a partially spherical convex region at the distal end 130 of the lower puncher 86 to overlie the outer concave surface of the male lens mold part 12 during demolding. A further feature of the present invention is a method for making the ophthalmic lens mold assembly demolder, the puncher, the puncher assembly, and using the puncher and the puncher assembly.

Figures 11, 12:
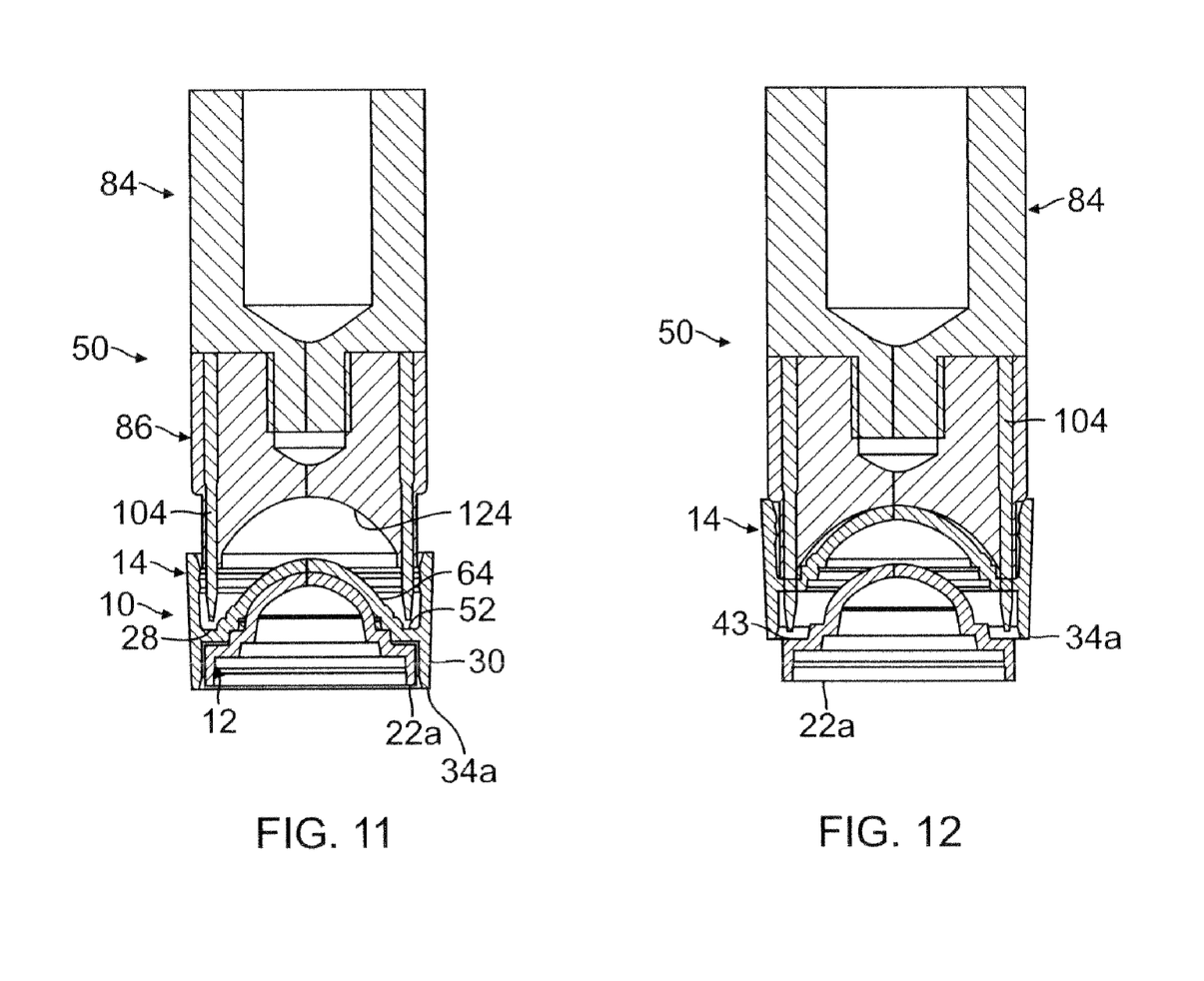
FIG. 11 is a cross-sectional side view of the puncher of FIGS. 5-10 moved over an ophthalmic lens mold assembly to be demolded.
FIG. 12 is a cross-sectional side view of the puncher of FIG. 11 after demolding the lens mold assembly.

With reference now to FIGS. 11 and 12 in addition to FIG. 3, the demolding assembly 44 may be used by placing a plurality of lens mold assemblies 10 (only one of which is shown in FIG. 3) into the loading palette 46 with the second axial ends 34a of the mold assemblies in first. The punch header 53 is then activated to move downward along the y-axis to move the pins 104 against the separation regions 42 of the female mold part 14. Alternatively, the pins 104 can be moved downward along the y-axis against separation regions of the male mold part 12. In an example, only the plurality of punchers 50 are moved and not the header 51, such by moving a corresponding number of shafts or pistons located inside the header while holding the header 51 stationary. In another example, the punchers 50 are held fixed relative to the header 51 and the header is moved downward along the y-axis.

FIG. 11 is schematic cross-sectional side view of one puncher 50 being moved against a mold assembly 10 for demolding. Just before the pins 104 contact and puncture through the puncture points 52 at the separation region 42 of the female mold part 14, the plurality of pins 104 and the distal end edge 128 of the lower puncher 86 move inside the boundary or cylinder defined by the cylindrical wall 30 of the female mold part 14. At this point, the partially spherical concave surface region 124 of the lower puncher 86 is spaced from the outer convex surface 64 of the female mold part 14 to enable further downward movement by the puncher without compressing the outer convex surface 64 of the female mold part 14. The puncher 50 is moved downward with a sufficient amount of force for a given pin tip diameter to rupture the flange area 28 of the female mold part 14. Alternatively, just before the pins 104 contact and puncture through the puncture points at the separation region of the male mold part 12, the plurality of pins and the distal end edge 128 of the lower puncher 86 move inside the boundary or cylinder defined by the cylindrical wall 22 of the male mold part 12. At this point, the partially spherical convex surface region of the lower puncher 86 is spaced from the outer concave surface of the male mold part 12 to enable further downward movement by the puncher without compressing the inner concave surface of the male mold part 12. The puncher 50 is moved downward with a sufficient amount of force for a given pin tip diameter to rupture the flange area 20 of the male mold part 12. Thus, as understood, a feature of the present invention is a puncher comprising at least one punch pin that moves along an axis and within a vertical cylinder defined by the lens mold to demold a lens mold assembly.

FIG. 12 is a schematic cross-sectional side view of the puncher 50 puncturing through the separation region 42 of the female mold part 14. In particular, the punch pins 104 are shown puncturing through the flange area 28 of the female mold part 14. Because the female mold part 14 is supported at its second axial end 34a, it resists the downward force applied by the plurality of punch pins 104 on the punch points 52 at the separation region 42 of the female mold part 12 until the pins rupture through the flange layer 28 of the female mold part 14. At this point, further downward movement by the puncher 50 forces the plurality of pins 104 to push against the impact points 43 located on the flange 20 of the male mold part 12. As discussed above with reference to FIG. 4, the axial end 22a of the male mold part 12 is not supported by any structure but only by mechanical engagement to the female mold part 14 at the mating engagement regions 18, 26 (FIG. 1), as well as by the contact between the polymerized lens body; any polymerized excess polymerizable composition present in regions 38, 40 or both 38 and 40; the male mold part 12; and the female mold part 14. Alternatively, the punch pins can puncture the separation region of the male mold part 12, with the punch pins 104 puncturing the flange area 20 of the male mold part 12. In this example, as the male mold part 12 is supported at its axial end 22a and has a rib diameter 66 that is larger than the wall diameter 68 of female mold part 14, the male mold part 12 resists the downward force applied by the plurality of punch pins 104 on the punch points 52 at the separation region of the male mold part 12 until the pins rupture through the flange layer 20 of the male mold part 12. At this point, further downward movement by the puncher 50 forces the plurality of pins 104 to push against the impact points located on the flange 28 of the female mold part 14. In this example where the punch pins 104 puncture the separation region of the male mold part 12, the second axial end 34a of the female mold part 14 is not supported by any structure but only by the mechanical engagement to the male mold part 12 at the mating engagement regions 18, 26, as well as by the contact between the polymerized lens body and any polymerized excess polymerizable composition present in regions 38, 40 or both 38 and 40. Thus, in this example, it is the female mold part 14 that is not supported by any structure and that will be released from the male mold part 12 by the downward force. However, since, in both these examples, the mechanical engagement and the contact between the lens parts and the polymerized material are weaker than the downward force imparted by the plurality of punch pins 104 and weaker than the puncture force to puncture the flange on the first mold part, the first mold part is forced axially downwardly by the force imparted by the plurality of punch pins 104 until the mechanical engagement of the two mold parts is overcome, which then causes the second mold part to disengage from the first mold part. In one example, after separation, the male mold part falls through the opening 62 of the loading palette 46 into a conveyor or collection system (not shown) and then moves to a subsequent station for processing. Alternatively, after separation, the female mold part falls through the opening 62 of the loading palette 46 into a conveyor or collector system and then moves to a subsequent station for processing. In one example, the second mold part which falls through the opening 62 of the loading palette has the ophthalmic lens body attached thereto. In another example, the first mold part which is punctured by the punch pin(s) has the ophthalmic lens body attached thereto.

With reference again to FIG. 3, the puncher header 53 returns to a starting or retraced position after demolding the plurality of lens mold assemblies so that a new set may be loaded for demolding. However, since in the illustrated example the female mold parts 14 have been punctured by the puncture pins 104, they tend stick to the pins and move with the punchers 50 during the punchers' return to their start position. As discussed above, a stripper plate 48 is incorporated to strip the first mold parts from the respective punchers 50. More specifically, as the punchers 50 return to their start position, they move upwardly along the y-axis and back through the through bores 70 of the stripper plate 48. In the illustrated example, as the female mold parts 14 are pierced by the pins 104 and the through bores 70 have a bore diameter 74 that is smaller than the cylindrical wall 30 of the female mold parts 14, the female mold parts 14 are stopped at the stripper plate 48 while the punchers 50 continue to move through and return to their respective start position. Alternatively, when the male mold parts 12 are pierced by the pins 104 and the through bores 70 have a bore diameter 74 that is smaller than the wall 22 of the male mold parts 12, the male mold parts 12 are stopped at the stripper plate 48 while the punchers 50 continue to move through and return to their respective start positions.

Thus, the present invention is also understood to include a method of manufacturing an ophthalmic lens. In one example, a method of manufacturing a molded ophthalmic les in accordance with the present invention comprises the steps of (a) providing a molded ophthalmic lens in a lens mold assembly, the lens mold assembly comprising a first mold part and a second mold part coupled to the first mold part; (b) placing the lens mold assembly under a puncher; said puncher comprising at least one punch pin comprising a tip; (c) moving the puncher along an axis within a cylinder defined by the lens mold assembly; (d) puncturing through a surface layer of the first mold part; and (e) pushing against a surface layer of the second mold part to separate the second mold part from the first mold part. In one example, the method comprises executing the steps sequentially in the indicated order.

In one example, the method of manufacturing an ophthalmic lens can be a method wherein the first mold part is a female mold comprising a concave lens forming surface and a wall having a first axial end and a second axial end. The method of manufacturing an ophthalmic lens can be a method further comprising supporting the second axial end by a loading palette during the puncturing step. The method can be a method wherein the first mold part has a wall defining a cylinder, and the method further comprises moving the at least one punch pin within the cylinder defined by the wall of the first mold part to puncture the surface layer. The method can be a method further comprising supporting an axial end of the first mold part with a support palette during the puncturing step. The method can be a method further comprising stripping the first mold part from the at least one punch pin following the puncturing step. The method can be a method wherein the step of stripping the first mold part comprises using a stripper plate located above the support palette. The method can be a method wherein the step of stripping the first mold part comprises using a stripper column located with the puncher. The method can be a method wherein the method further comprises the step of transferring at least one of the first mold part or the second mold part for further processing. The method can be a method wherein the ophthalmic lens is a contact lens, and the method further comprises: providing a polymerizable contact lens formulation in the lens mold assembly; polymerizing the polymerizable contact lens formulation in the lens mold assembly to form a polymerized molded contact lens; separating the polymerized molded contact lens from one of the separated mold parts to produce a separated contact lens; contacting the separated contact lens with a liquid; placing the separated contact lens in contact lens package; sterilizing the contact lens in the contact lens package to produce a sterilized contact lens; or combinations thereof.

Another example of a method in accordance with the present invention is a method of manufacturing a molded ophthalmic lens, the method comprising the steps of (a) providing a molded ophthalmic lens in a lens mold assembly, the lens mold assembly comprising a first mold part and a second mold part coupled to the first mold part; (b) moving a puncher comprising at least one punch pin extending beyond a distal end of a punch body through an opening of a stripper device for stripping one of the lens mold parts; (c) stopping the moving before the puncher reaches a support palette configured for supporting the lens mold assembly; and (d) returning the puncher to a position that requires the puncher to move back through the opening of the stripper device. In one example, the method comprises executing the steps sequentially in the indicated order.

In one example, the method is understood to include the step of driving a puncher comprising at least one punch pin towards a lens mold assembly so that the at least one punch pin punctures through a flange layer of a first part of the lens mold assembly and pushes against another flange layer of a second part of the lens mold assembly until the two mold halves separate from one another. In one particular example, the method further includes the step of supporting a rim on the first part the lens mold assembly by a flange located on a loading palette and permitting the second part of the mold assembly to fall through an opening of the loading palette after the separation.

In a still further example of the present method, two or more punchers are incorporated for concurrently demolding two or more two-part mold assemblies by axially separating one flange from another flange. The two-part mold assembly may be understood to include a first mold part and a second mold part and provisions may be incorporated so that the second mold part separates from the first mold part and falls safely into a transfer system or tray for moving to another station for processing, such as for delensing the ophthalmic lens from the second mold part. In another example, the two-part mold assembly may be understood to include a first mold part and a second mold part and provisions may be incorporated so that the first mold part separates from the first mold part and falls safely into a transfer system or tray for moving to another station for processing, such as for delensing the ophthalmic lens from the first mold part. In another example, the two-part mold assembly may be understood to include a male mold part and a female mold part and provisions may be incorporated so that the male mold part separates from the female mold part and falls safely into a transfer system or tray for moving to another station for processing, such as for delensing the ophthalmic lens from the male mold part. In yet another example, the two-part mold assembly may be understood to include a female mold part and a male mold part and provisions may be incorporated so that the female mold part separates from the male mold part and falls safely into a transfer system or tray for moving to another station for processing, such as for delensing the ophthalmic lens from the female mold part. In one particular example, two parallel plates each comprising a plurality of through openings are used, one to hold and/or support the plurality of lens mold assemblies and one to strip the plurality of first mold parts after the demolding step.

Still furthermore, the present invention is understood to include a system for demolding a lens mold in which a layer of one mold part is severed or punctured through to push against the other mold part to separate the two mold parts from one another. In a particular example of the system for demolding, a puncher comprising at least one punch pin is used and wherein the punch pin moves along an axis located within a vertical cylinder defined by the mold assembly to puncture through one mold part and push against another mold part to separate the two from one another. A still further feature of the present invention is a method for using the system for demolding and components that make up the demolding system.

Figure 13:
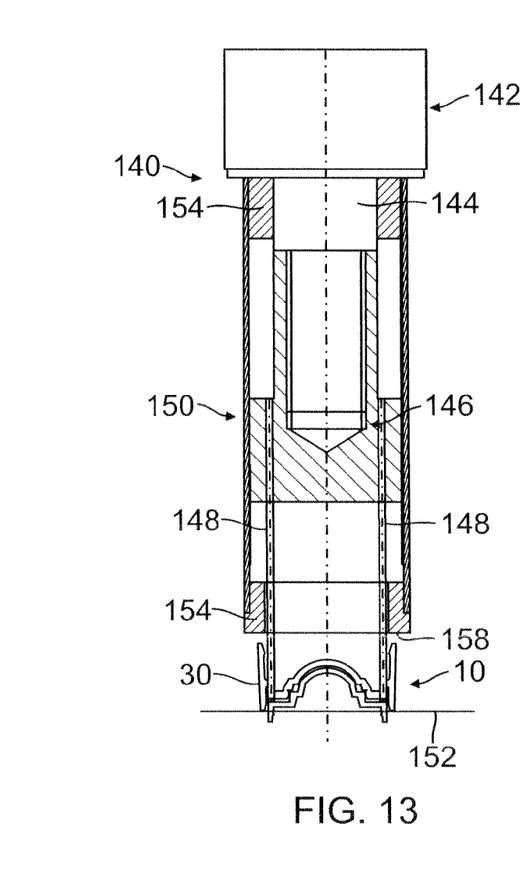
FIGS. 13-15 are cross-sectional side views of an alternative ophthalmic lens mold assembly demolder.

FIG. 13 is a schematic cross-sectional side view of a demolding assembly provided in accordance with another example of the present invention, which is generally designated 140. The demolding assembly or demolder 140 may be practiced as a single puncher demolder in which only one mold assembly is separated at a time or as a multi-puncher demolder in which a plurality of lens mold assemblies are concurrently separated at a time. Accordingly, while the following discussions relate to a single puncher demolder, they are understood to apply equally to a multi-puncher demolder by increasing the number of components involved.

In one example, the demolder comprises a header 142, an actuator stem 144 that is movable relative to the header, a puncher 146 mounted to the actuator stem and having one or more punch pins 148, such as two to six punch pins, and a stripper column 150, similar to that discussed above with reference to FIG. 3. The demolder 140 is configured to demold a lens mold assembly 10 located on a loading palette 152, similar to the loading palette 46 discussed above with reference to FIG. 4.

Unlike the puncher 50 of FIG. 10 however, the present puncher 146 is made from a unitary or single component and has a socket for attaching to the actuator stem 144. The punch pins 148 are attached to the puncher 146 by pushing them into the individual punch bores from the distal end 158 of the puncher.

The puncher 146 and the stripper column 150 are configured to move together along a y-axis from a first position (not shown) above the lens mold assembly 10 to a second closer position above the lens mold assembly 10, which is less than the distance measured to the first position. For purposes of discussion, the second position is represented by FIG. 13. The puncher 146 and the stripper column 150 may move together using conventional methods, such as by gearing, actuators, latching means, and cam followers. One or more bushings 154, 156 may also be used for guiding, coupling, or alignment purposes. As shown, the lower bushing 154 has an inside diameter that is configured to extend around the outside of a cylindrical profile formed by the plurality of punch pins 148 but smaller than the cylindrical wall 30 of the female mold part 14 so as to strip the female mold part from the pins following demolding, as discussed above. Alternatively, the lower bushing 154 can have an inside diameter that is configured to extent around the outside of a cylindrical profile formed by the plurality of punch pins 148 but smaller than the wall 22 of the male mold part 12 so as to strip the male mold part from the pins following demolding, as discussed above.

Figure 14:
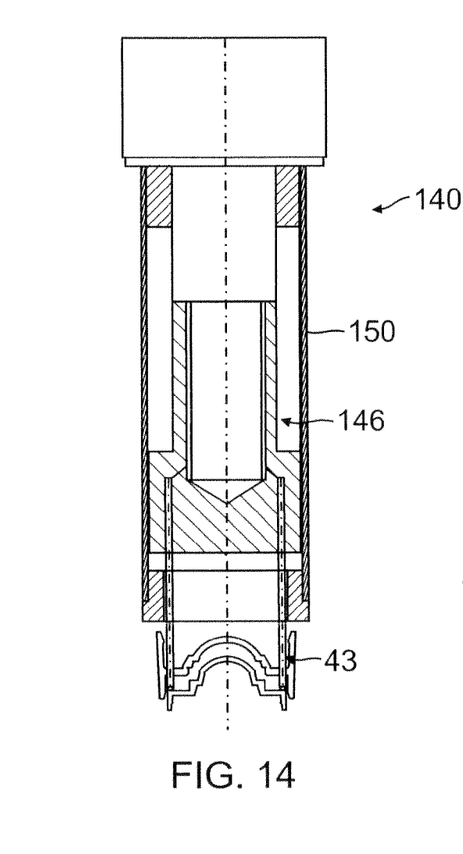

FIG. 14 is a schematic cross-sectional side view of the demolder 140 of FIG. 13, which shows the stripper column 150 in the same second position but the puncher 146 advanced from the second position to a third position relative to the stripper column 150 and to the lens mold assembly 10 to punch through the separation region 42 of the mold assembly. As discussed above, because the female mold part 14 is held axially fixed by the loading palette 152 and not the male mold part 12, the male mold part 12 is pushed by its flange away from the female mold part to separate from the female mold part. This effectively demolds the lens mold assembly 10 and allows the ophthalmic lens located on the male mold part 12 to be collected for further processing. Alternatively, when the male mold part 12 has a rib diameter 66 that is greater than the wall diameter 68 of the female mold part 14, the male mold part 12 can be held axially fixed by the loading palette 152 and not the female mold part 14, the female mold part 14 is pushed by its flange away from the assembly 10 and allows the ophthalmic lens body located on the female mold part 14 to be collected for further processing. In yet another embodiment, the first mold part pierced by the pins 104 (either the male mold part 12 or the female mold part 14) can be collected and the ophthalmic lens body located thereon can be collected for further processing. Following demolding, the puncher 146 is moved from the third position (FIG. 14) back to the second position (FIG. 13) to strip the first mold part from the punch pins and then the combination puncher 146 and stripper column 150 move from the second position (FIG. 13) to the first position (not shown).

Figure 15:
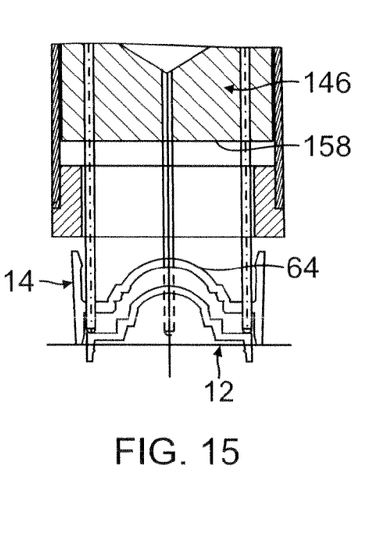

FIG. 15 is a schematic cross-sectional enlarged side view of the demolder 140 of FIG. 14. As shown, the distal end 158 of the puncher 158 is spaced apart from the outer convex surface 64 of the female mold part 14 when in the third punching position to separate the male mold part 12 from the female mold part 14. As such, a partial concave spherical surface is not required at the distal end of the puncher to accommodate the convex surface of the female mold part 14. However, the same partial concave spherical surface may be incorporated without deviating from the spirit and scope of the present invention. Alternatively, when the demolder is used to pierce the male mold part 12, the distal end 158 of the puncher can be spaced apart from the outer concave surface of the male mold part 12 when in the third punching position to separate the male mold part 12 from the female mold part 14. As above, a partial convex spherical surface is not required at the distal end of the puncher to accommodate the concave surface of the male mold part 12, although a partial convex spherical surface can be incorporated without deviating from the spirit and scope of the present invention.

In another example, the demolder of the present invention can further comprise a device for applying a force to a portion of at least one mold member, and the methods of the present invention can further comprise the step of applying a force to a portion of at least one mold member. The device, for example, can be configured to compress or squeeze a portion of a mold member. The device can further comprise a device to apply a vice grip type squeezing action to the mold member, and the method can further comprise applying a vice grip type squeezing action to the mold member. The mold member to which the force is applied can be the first mold member or the second mold member. The portion of the mold member to which the force is applied can comprise two or more external regions of the mold member. For example, female mold member 14 can be compressed or squeezed along the cylindrical wall 30, along the first rib or rim region 32, along the second rib or rim region 34, or combinations thereof. The male mold member 12, for example, can be compressed or squeezed along the skirt section 22.

In accordance with the methods of the present invention, the force can be applied to the portion of the first mold member at the same time the first mold member is being pierced by a pin of the demolder. Alternatively, the force can be applied to the portion of the first mold member before or after the first mold member is pierced by a pin of the demolder.

While not being bound by theory, when the force applied to the portion of the first mold member is a compressing or squeezing action, the compressing or squeezing action can generate force components which radiate outward around the lens perimeter without transmitting substantial radial force components to the other mold member. These force components can cause the mold surface of the mold member to which the force was applied to flex away from the mold surface of the other mold member. This flexing away of the two mold surfaces can break the attachment of a flash ring from the lens, as well as causing a slight separation of the molded lens body from a mold surface, particularly around the edge of the lens. As this slight separation occurs while the molded lens body is still encased in the two mold members, the amount of distortion produced in the molded lens body as a result is minimized. In addition, this flexing can cause the flash ring to separate from the molded lens body, and, under some circumstances, can facilitate retention of the molded lens body on either the male mold member 12 or the female mold member 14, depending on which configuration is desired.

As shown and described, features of an alternative example are understood to include a demolding assembly comprising a puncher comprising at least one punch pin and a stripper column, wherein the stripper column and the puncher are configured to move together from a first position to a second position and relative to one another when the puncher moves from the second position to the third position. A still further feature of the present example is understood to include a demolding assembly comprising a one-part pusher having at least one punch pin for puncturing a first mold part of a two mold part assembly and pushing against a second mold to separate the first mold part from the second mold part.

Although specific examples of demolding assemblies and their components have been specifically described and illustrated herein, many modifications and variations will be apparent to those skilled in the art. For example, the various demolding assemblies may have components that are automated, may have fewer or more components that perform the same overall tasks, and may use different materials than described. Furthermore, it is understood and contemplated that features specifically discussed for one demolder example may be adopted for inclusion with another demolder example, provided the functions are compatible. Accordingly, it is to be understood that the demolder assemblies and their components constructed according to principles of this invention may be configured other than as specifically described. It is further understood that terms such as first, second, male, and female are used to conveniently differentiate one component or position from another component or position only and do not necessarily restrict the terms to a specific definition unless the context indicates otherwise. The invention is also defined in the following claims.

What is claimed is:

1. A method of manufacturing a molded ophthalmic lens, comprising:
   providing a molded ophthalmic lens in a lens mold assembly, the lens mold assembly comprising a first mold part and a second mold part coupled to the first mold part;
   placing the lens mold assembly under a puncher; said puncher comprising at least one punch pin comprising a tip;
   moving the puncher along an axis within a cylinder defined by the lens mold assembly;
   puncturing through a surface layer of the first mold part; and
   pushing against a surface layer of the second mold part to separate second mold part from the first mold part.

2. The method of claim 1, wherein the first mold part is a female mold comprising a concave lens forming surface and a wall having a first axial end and a second axial end.

3. The method of claim 2, further comprising supporting the second axial end by a loading palette during the puncturing step.

4. The method of claim 1. wherein the first mold part has a wall defining a cylinder, and the method further comprises moving the at least one punch pin within the cylinder defined by the wall of the first mold part to puncture the surface layer.

5. The method of claim 1, further comprising supporting an axial end of the first mold part with a support palette during the puncturing step.

6. The method of claim further comprising stripping the first mold part from the at least one punch pin following the puncturing step.

7. The method of claim 6, wherein the step of stripping the first mold part comprises using a stripper plate located above the support palette.

8. The method of claim 6, wherein the step of stripping the first mold part comprises using a stripper column located with the puncher, 9. The method of claim I, wherein the method further comprises the step of transferring least one of the first mold part or the second mold part for further processing.

10. The method of claim 1, wherein the ophthalmic lens is a contact lens, and the method further comprises: providing a polymerizable contact lens formulation in the lens mold assembly; polymerizing the polymerizable contact lens formulation in the lens mold assembly to form a polymerized molded contact lens; separating the polymerized molded contact lens from one of the separated mold parts to produce a separated contact lens; contacting the separated contact lens with a liquid; placing the separated contact lens in contact lens package; sterilizing the contact lens in the contact lens package to produce a sterilized contact lens: or combinations thereof.

* * * * *

UNITED STATES PATENT AND TRADEMARK OFFICE
CERTIFICATE OF CORRECTION

| | | |
|---|---|---|
| PATENT NO. | : 8,313,675 B2 | Page 1 of 1 |
| APPLICATION NO. | : 12/849645 | |
| DATED | : November 20, 2012 | |
| INVENTOR(S) | : Gerardo Plaza et al. | |

It is certified that error appears in the above-identified patent and that said Letters Patent is hereby corrected as shown below:

On Title Page 2, Item (56), under "Foreign Patent Documents", column 2, line 6, delete "6/1926" and insert -- 6/2008 --, therefor.

In the Specifications:

In column 1, line 3, delete "CROSS-REFERENCED" and insert -- CROSS-REFERENCE --, therefor.

In column 4, line 2, delete "(e.g." and insert -- (e.g., --, therefor.

In column 12, line 6, delete "les" and insert -- lens --, therefor.

In column 12, line 53, delete "sterlizing" and insert -- sterilizing --, therefor.

In the Claims:

In column 16, line 51, in Claim 1, after "separate" insert -- the --.

In column 16, line 58, in Claim 4, delete "claim 1." and insert -- claim 1, --, therefor.

In column 16, line 65, in Claim 6, delete "claim" and insert -- claim 1, --, therefor.

In column 17, line 6, in Claim 8, delete "puncher," and insert -- puncher. --, therefor.

In column 17, line 7, in Claim 9, delete "claim I," and insert -- claim 1, --, therefor.

In column 17, line 8, in Claim 9, after "transferring" insert -- at --.

In column 18, line 8, in Claim 10, delete "lens:" and insert -- lens; --, therefor.

Signed and Sealed this
Twentieth Day of August, 2013

Teresa Stanek Rea
*Acting Director of the United States Patent and Trademark Office*